Sept. 18, 1956 D. C. WILLIAMS 2,763,198
TOASTER INSERT
Filed Nov. 16, 1953
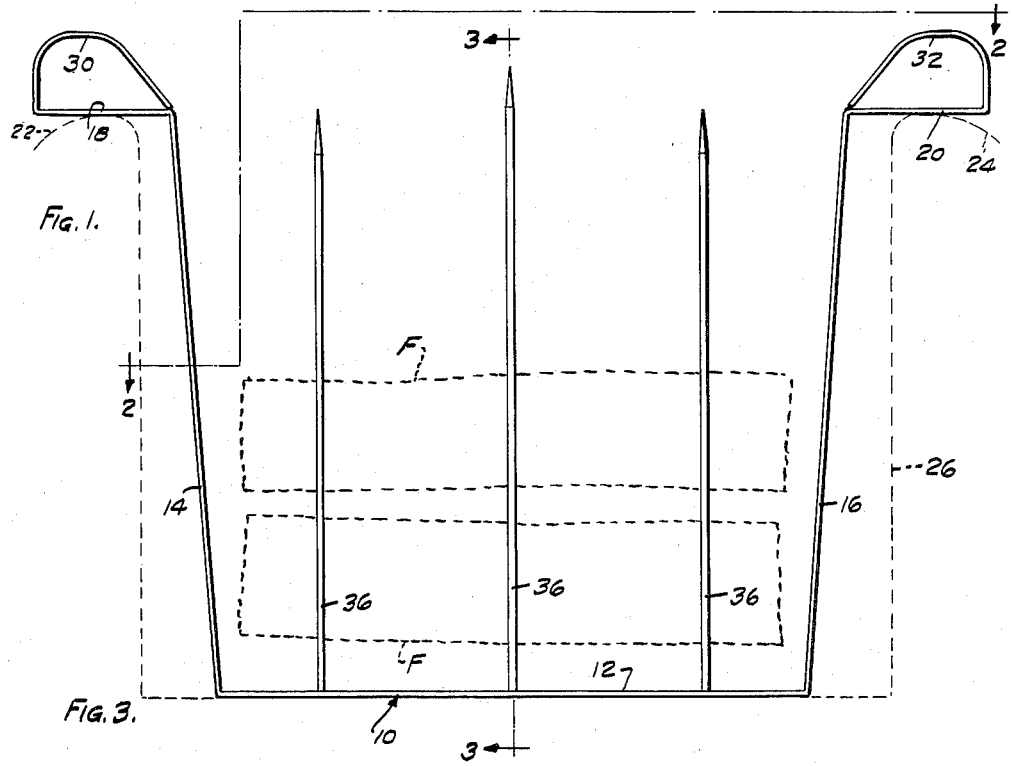
Fig. 1.
Fig. 3.
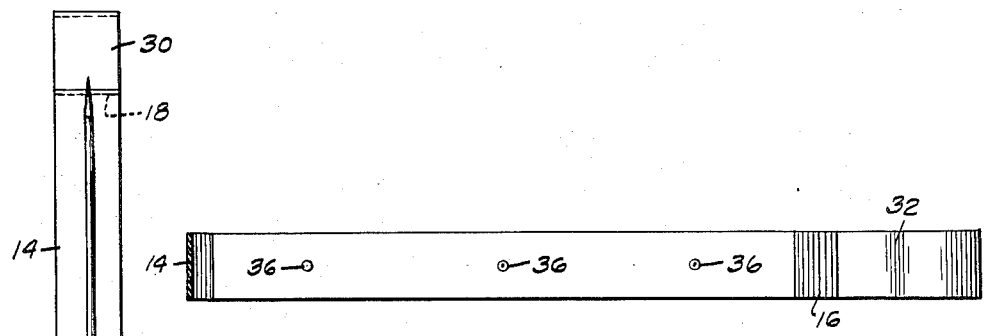
Fig. 2.
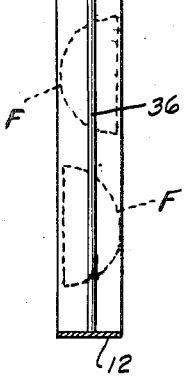
INVENTOR.
DONALD C. WILLIAMS
BY
Harry H. Hitzeman
ATTORNEY.

United States Patent Office 2,763,198
Patented Sept. 18, 1956

2,763,198

TOASTER INSERT

Donald C. Williams, Elgin, Ill.

Application November 16, 1953, Serial No. 392,079

4 Claims. (Cl. 99—339)

My invention relates to a toaster insert.

My invention relates more particularly to a toaster insert which may be in the form of a frame capable of being inserted in any one of the standard electric toasters that are at present on the market.

The purpose of the insert is to provide a unit for supporting foods other than the usual slice of bread in the toaster to be cooked therein, the unit being for the express purpose of permitting the introduction or removal of the food product without in any way requiring other tools for the removal of the same.

The principal object of the invention is to provide a toaster insert of the type described that is easily and cheaply made, capable of use by ordinary individuals, and one which will not become broken in spite of long and hard usage.

A further object of the invention is to provide a device of the type described which is capable of supporting food which may be introduced into the bread slice receiving well of a toaster for cooking and removal.

A further object of the invention is to make a device of the class described which may be used with any one of a large number of standard electric toasters at present on the market.

A further object of the invention is to provide a device of the type described provided with handles upon opposite sides for easy and quick manipulation and use.

Other objects and advantages will be more apparent from the following description wherein reference is had to the accompanying drawings, upon which Fig. 1 is a side elevational view of the toaster insert shown in position in one of the bread slice receiving wells of a toaster, the outline of the well of the toaster being shown in dotted lines;

Fig. 2 is a plan sectional view of the unit taken generally on the line 2—2 of Fig. 1; and Fig. 3 is a vertical cross-sectional view taken on the line 3—3 of Fig. 1.

In the embodiment of the invention which I have chosen to illustrate and describe the same, I have shown a generally U-shaped frame 10 which is made of a strip of flat sheet metal, preferably stainless steel about one-half inch wide. This is bent to the shape shown to include a flat base portion 12 and upwardly extending side leg portions 14 and 16. At the upper ends of the leg portions 14 and 16 I provide transverse portions 18 and 20 to seat the unit upon the edges 22 and 24 of the bread receiving well 26 of the usual electric bread toaster. The portions 18 and 20 may be bent upwardly and inwardly as shown at 30 and 32 to provide loops or handles at the two ends of the unit.

In order to support frankfurters, sliced meat, partial pieces of bread, or other edibles upon the insert for the purpose of submitting them to the heat of the electric toaster, I provide a plurality of pointed upright prong members 36 welded or otherwise firmly attached to the base 12 medially of the sides of the same. I prefer to make the center prong slightly longer than the others so that half of a frankfurter or other material can be impaled upon the same first to permit of easier forcing of the other prongs through the material.

Thus as shown in Fig. 1 in dotted lines, I have placed a pair of frankfurter halves F upon the prongs of the holder. The insert can now be placed in the bread slice receiving well of the toaster and the toaster turned on. As soon as the frankfurters are heated to the desired degree, the insert may be removed by the handles 30 and 32. It will be noted that the U-shaped frame is made of sufficiently thin stainless steel so that it is comparatively resilient, thus eliminating any bending or warping which might be caused by the high temperature to which the unit is subjected.

In practice I have found that with a unit of the size shown, two frankfurters may be cut in half lengthwise and the four halves impaled upon the prongs and cooked at the same time. Due to the heat of the unit, it is preferable to remove the same with two forks and lay the unit with the cooked frankfurters on a plate, at which time a fork may be placed over the base 12 of the unit and the cooked frankfurters removed with the other fork.

While I have shown the frame in its preferred form as constructed of a continuous strip of stainless steel, it is apparent that the same may be in the form of an ordinary wire or it may be made of cast metal, the main requirement being that it is generally U-shaped and provided with vertically disposed prongs upon which the food to be cooked may be impaled.

I contemplate that changes and modifications may be made in the exact details shown and I do not wish to be limited in any particular; rather what I desire to secure and protect by Letters Patent of the United States is:

1. The combination with an electric toaster of the type having a slice receiving well, of a unit for grilling frankfurters which comprises an open U-shaped frame having a flat base and tapered upright legs and being of a size capable of insertion into the slice receiving well of said toaster, said frame being flat sheet metal narrower in width than the width of said slice receiving well, the base of said U-shaped frame having a plurality of vertically disposed prongs secured thereto and extending upwardly to a point adjacent the top of said open U-shaped frame, the upper ends of the upright legs of said frame being provided with outwardly extending handles which rest on the edges of said receiving well to support said unit in said well.

2. The combination with an electric toaster of the type having a slice receiving well, of a unit for grilling frankfurters which comprises an open U-shaped frame having a flat base and tapered upright legs and being of a size capable of insertion into the slice receiving well of said toaster, said frame being flat sheet metal narrower in width than the width of said slice receiving well, the base of said U-shaped frame having a plurality of vertically disposed prongs secured thereto and extending upwardly to a point adjacent the top of said open U-shaped frame, the upper ends of the upright legs of said frame being provided with outwardly extending handles which rest on the edges of said receiving well to support said unit in said well, said prongs being equally spaced on the base of said frame and aligned medially of the same.

3. A unit for grilling frankfurters which comprises an open-ended U-shaped frame, said frame being made of flat spring metal and having a base and tapered upright legs, the base of said frame having a plurality of vertically disposed prongs secured thereto and extending upwardly to a point adjacent the open top of said frame, the upper ends of the upright legs of said frame being provided with outwardly extending handles, said handles formed by bending the upper ends of the legs outwardly, upwardly and back to form loops.

4. A unit for grilling frankfurters which comprises an open-ended U-shaped frame, said frame being made of flat spring metal and having a base and tapered upright legs, the base of said frame having a plurality of vertically disposed prongs secured thereto and extending upwardly to a point adjacent the open top of said frame, the upper ends of the upright legs of said frame being provided with outwardly extending handles, said handles formed by bending the upper ends of the legs outwardly, upwardly and back to form loops, said prongs being aligned medially of said base.

References Cited in the file of this patent

UNITED STATES PATENTS

| | | |
|---|---|---|
| 363,519 | Houston | May 24, 1887 |
| 1,630,188 | Knauff | May 24, 1927 |
| 2,152,023 | Botti | Mar. 28, 1939 |
| 2,181,204 | Ricard | Nov. 28, 1939 |
| 2,239,862 | Scalf et al. | Apr. 29, 1941 |
| 2,357,288 | Ricard | Sept. 5, 1944 |
| 2,374,302 | Orkfritz | Apr. 24, 1945 |

FOREIGN PATENTS

| | | |
|---|---|---|
| 26,714 | Great Britain | 1902 |